United States Patent
Iwamoto et al.

(10) Patent No.: US 6,452,295 B1
(45) Date of Patent: *Sep. 17, 2002

(54) ENGINE STARTER WITH A THERMOSTAT FOR THERMAL PROTECTION

(75) Inventors: Atsuya Iwamoto; Shigeru Shiroyama; Katsunori Yagi, all of Tokyo (JP)

(73) Assignee: Mitsubishi Denki Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/352,406

(22) Filed: Jul. 14, 1999

(30) Foreign Application Priority Data

Jan. 26, 1999 (JP) .......................................... 11-017488

(51) Int. Cl.⁷ ...................... H02K 11/00; H02K 13/00; H01R 39/38; F02N 11/00; F02N 11/06; H02P 11/00; H02P 9/04

(52) U.S. Cl. .................. 310/68 C; 310/68 R; 310/239; 310/238; 290/40 R; 290/38 R

(58) Field of Search ................................ 290/36 R, 27, 290/22, 48, 38 E, 49, 37 R, 38 R; 310/68 A, 68 C, 83, 89, 239; 74/6, 7 R

(56) References Cited

U.S. PATENT DOCUMENTS

| | | | | |
|---|---|---|---|---|
| 3,675,056 A | * | 7/1972 | Lenz ............................ | 310/54 |
| 4,028,570 A | * | 6/1977 | Kieffer et al. ............ | 310/68 C |
| 4,389,692 A | * | 6/1983 | Sander et al. .................. | 361/29 |
| 4,658,321 A | * | 4/1987 | Lindner ........................ | 361/25 |
| 4,674,344 A | * | 6/1987 | Kazino et al. ................... | 74/7 |
| 4,713,717 A | * | 12/1987 | Pejouhy et al. ............... | 361/26 |
| 5,046,156 A | * | 9/1991 | Hofsass ..................... | 337/380 |
| 5,103,107 A | * | 4/1992 | Yamamoto et al. ........... | 290/48 |
| 5,140,205 A | * | 8/1992 | Baines ........................ | 310/68 |
| 5,200,872 A | * | 4/1993 | D'Entremont et al. ........ | 361/25 |
| 5,227,751 A | * | 7/1993 | Shiroyama et al. ......... | 335/126 |
| 5,239,954 A | * | 8/1993 | Boegner et al. ......... | 123/179.3 |
| 5,294,852 A | * | 3/1994 | Straker ........................ | 310/68 |
| 5,343,613 A | * | 9/1994 | Kintz et al. ................... | 29/596 |
| 5,539,264 A | * | 7/1996 | Kuragaki et al. ........... | 310/239 |
| 5,770,901 A | * | 6/1998 | Niimi et al. .................. | 310/52 |
| 5,783,885 A | * | 7/1998 | Post ......................... | 310/90.5 |
| 5,994,805 A | * | 11/1999 | Iwamoto et al. .......... | 310/68 C |
| 6,055,141 A | * | 4/2000 | Dorschky et al. ............. | 361/25 |
| 6,198,186 B1 | * | 3/2001 | Wallace et al. ........... | 310/68 C |

FOREIGN PATENT DOCUMENTS

| | | | |
|---|---|---|---|
| FR | 2717961 A | * | 9/1995 |
| FR | 002717961 A1 | * | 9/1995 |
| JP | 56-37441 | | 8/1954 |

* cited by examiner

*Primary Examiner*—Nestor Ramirez
*Assistant Examiner*—Julio C. Gonzalez Ramirez
(74) *Attorney, Agent, or Firm*—Sughrue Mion, PLLC

(57) ABSTRACT

A starter comprises a thermostat for detecting increases in the temperature of brushes and interrupting the energizing of the starter, and a heat conducting member secured to the thermostat for conducting the heat of one of the brushes, the heat conducting member being attached to the brush. The heat conducting member may also be formed integrally with a brush holder. The heat conducting member may additionally be secured to a bracket so as to hold a base therebetween. The heat conducting member may also be composed of a metallic material having superior thermal conductivity, and may be copper or brass. An electrically insulating sheet may be held between the brush holders and the base as heat insulating material for preventing the transfer of heat from the brushes to the base. An electrically insulating tube may also be interposed between the thermostat and a first leg of the heat conducting member.

14 Claims, 5 Drawing Sheets

ENGINE STARTER WITH A THERMOSTAT FOR THERMAL PROTECTION

BACKGROUND OF THE INVENTION

1. Field of the Invention

The present invention relates to a starter provided with a thermostat.

2. Description of the Related Art

A starter is activated by the action of switching on a start switch of a key switch, whereby an engine is ignited and started. Once the engine is ignited and started, the starter is deactivated by the action of switching off the start switch of the key switch. At that time, for reasons such as incomplete return of the key switch, etc., the start switch may not be switched off and the starter may continue to be energized even after the engine has been started, whereby the starter generates heat and is damaged by that heat.

For that reason, in conventional techniques a thermostat is built into the starter to detect the ambient temperature within the starter and terminate operation of the starter if the ambient temperature within the starter exceeds a predetermined temperature in order to prevent excessive continuous energizing of the starter.

Actual examples of such starters include starters with a thermostat built directly into one of the brushes and starters with a thermostat disposed beside one of the brushes.

FIG. 7 is a cross-section showing an example of a starter with a thermostat disposed beside one of the brushes.

In the figure, the shaft 103 of an armature 101 comprising commutator segments 102 disposed plurally around the circumference thereof and constituting a motor portion is supported by a bearing 104 so as to be able to rotate freely. The bearing 104 is inserted into and supported by a recess portion 105a disposed in a thin-walled rear bracket 105 which houses the armature 101.

Brushes 106 which contact the commutator segments 102 and, together with the commutator segments 102, constitute contacts for supplying electric current to the armature 101 are disposed in positions facing the commutator segments 102. Lead wires 110 are connected to the brushes 106. The brushes 106 are pressed against the commutator segments 102 with a predetermined pressure by springs 107 and are supported by brush holders 108. The brush holders 108 are disposed at four positions equidistantly spaced around the circumference of the armature 101 and are secured to a base 109 by rivets (not shown). A female thread is disposed in the base 109, and the base 109 and the rear bracket 105 are secured to each other by inserting a bolt from the outer end surface of the rear bracket 105 into a bore (not shown) disposed in the end of the rear bracket 105 so that the bolt engages the female thread disposed in the base 109. In this way, the brush holders 108 are supported by the rear bracket 105.

The brushes 106 are heated by heat generated by friction between the brushes 106 and the commutator segments 102 and by heat generated by the motor portion of the starter which is conducted to the brushes 106. A long, slender, rod-shaped thermostat 160 for detecting increases in the temperature of the brushes due to brush heat being the heat contained in the brushes 106 and interrupting the energizing of the starter is disposed in the vicinity of the brushes 106 radially outside the brushes 106 relative to the armature 101 such that the longitudinal direction of the thermostat 160 is parallel to the axial direction of the armature 101.

Within the thermostat 160 which comprises a hollow pipe-shaped steel terminal 165 having a closed end, one tip of a lead wire 161 which is one of two lead wires indicated by broken lines in the figure is connected to one end of a bimetallic element 162, and a contact 163 is disposed on the other end of the bimetallic element 162. Another contact 166 is disposed on one tip of the other lead wire 164. The bimetallic element 162 deforms such that above a predetermined temperature the contacts 163, 166 are open and on or below the predetermined temperature the contacts 163, 166 are closed.

The two lead wires 161, 164 lead from the steel terminal 165 to the outside, extending so as to be insulated from each other, and a male terminal 167 is connected to the tip of each of the lead wires 161, 164. A connector 168 is integrally formed by molding resin such that the two lead wires 161, 164 are covered.

An O-ring 169 is disposed on the cylindrical outer circumferential portion 168a of the connector 168. A flat plate-shaped flange 168b extends from the vicinity of the center of the connector 168. The connector 168 which is integrated with the thermostat 160 is secured to the rear bracket 105 by inserting a bolt 115 into a bore 168c disposed in the flange 168b and engaging a female thread 105a disposed in the rear bracket 105.

A hollow cylindrical resin holder 116 having a closed end fits over the steel terminal 165 of the thermostat 160 and is disposed on an outer circumferential portion of the steel terminal 165.

However, in many starters with a thermostat disposed in the vicinity of the brushes, the brush heat is transferred to the thermostat by radiation through air and it takes time for the brush heat to be transferred as far as the thermostat, making the temperature increases in the thermostat slower than the temperature increases in the brushes. For that reason, in some cases the starter may possibly be damaged by heat before the operation of the starter is terminated by the action of the thermostat.

Furthermore, in starters with a thermostat built into one of the brushes, installation of the thermostat is difficult because the thermostat is embedded in the brush, and even if installation is possible the brush has to be enlarged, making the starter larger.

SUMMARY OF THE INVENTION

The present invention aims to solve the above problems and an object of the present invention is to provide a compact starter with superior heat transfer efficiency wherein the brush heat is conducted directly to the thermostat by means of a heat conducting member interposed between one of the brushes and the thermostat.

In order to achieve the above object, according to one aspect of the present invention, there is provided an engine starter comprising:

a starter motor for starting an engine, the starter motor including a brush and a brush holder; and a control circuit for controlling the starter motor, the control circuit including a thermostat for deenergizing the starter motor when the temperature of the starter motor exceeds a predetermined temperature;

the engine starter further comprising:

a heat conducting member, having a first end thermally coupled to the brush and a second end thermally coupled to the thermostat, for conducting heat from the brush to the thermostat.

According to another aspect of the present invention, the thermostat is secured to the heat conducting member and the heat conducting member is a substantially only means for mechanically supporting the thermostat.

According to another aspect of the present invention, the heat conducting member supports the thermostat within the starter motor with a thermally insulating air gap defined therearound.

According to another aspect of the present invention, the heat conducting member is a substantially "L"-shaped metal member having first and second legs of "L", the first leg being thermally coupled to and extending from the brush in a substantially radial direction of the starter motor, and the second leg extending in a substantially axial direction of the starter motor and substantially along the thermostat.

According to another aspect of the present invention, the second leg has a bend portion for positioning the thermostat on the second leg.

According to another aspect of the present invention, the thermostat and the second leg of the heat conducting member are wrapped together by an adhesive tape.

According to another aspect of the present invention, an electrically insulating material is interposed between the thermostat and the second leg of the heat conducting member.

According to another aspect of the present invention, the first end of the heat conducting member is embedded within the brush.

According to another aspect of the present invention, the first end of the heat conducting member is an integral, continuous extension of the brush holder.

According to another aspect of the present invention, the first end of the heat conducting member extends from a mounting flange of the brush holder.

According to another aspect of the present invention, the first end of the heat conducting member is mechanically fastened to the brush holder.

According to another aspect of the present invention, the first end of the heat conducting member is held between a rear bracket of the starter motor and the brush holder secured to each other.

According to another aspect of the present invention, a thermally insulating material is interposed between the rear bracket and the first end of the heat conducting member.

DETAILED DESCRIPTION OF THE PREFERRED EMBODIMENTS

Embodiment 1

Figure 1:
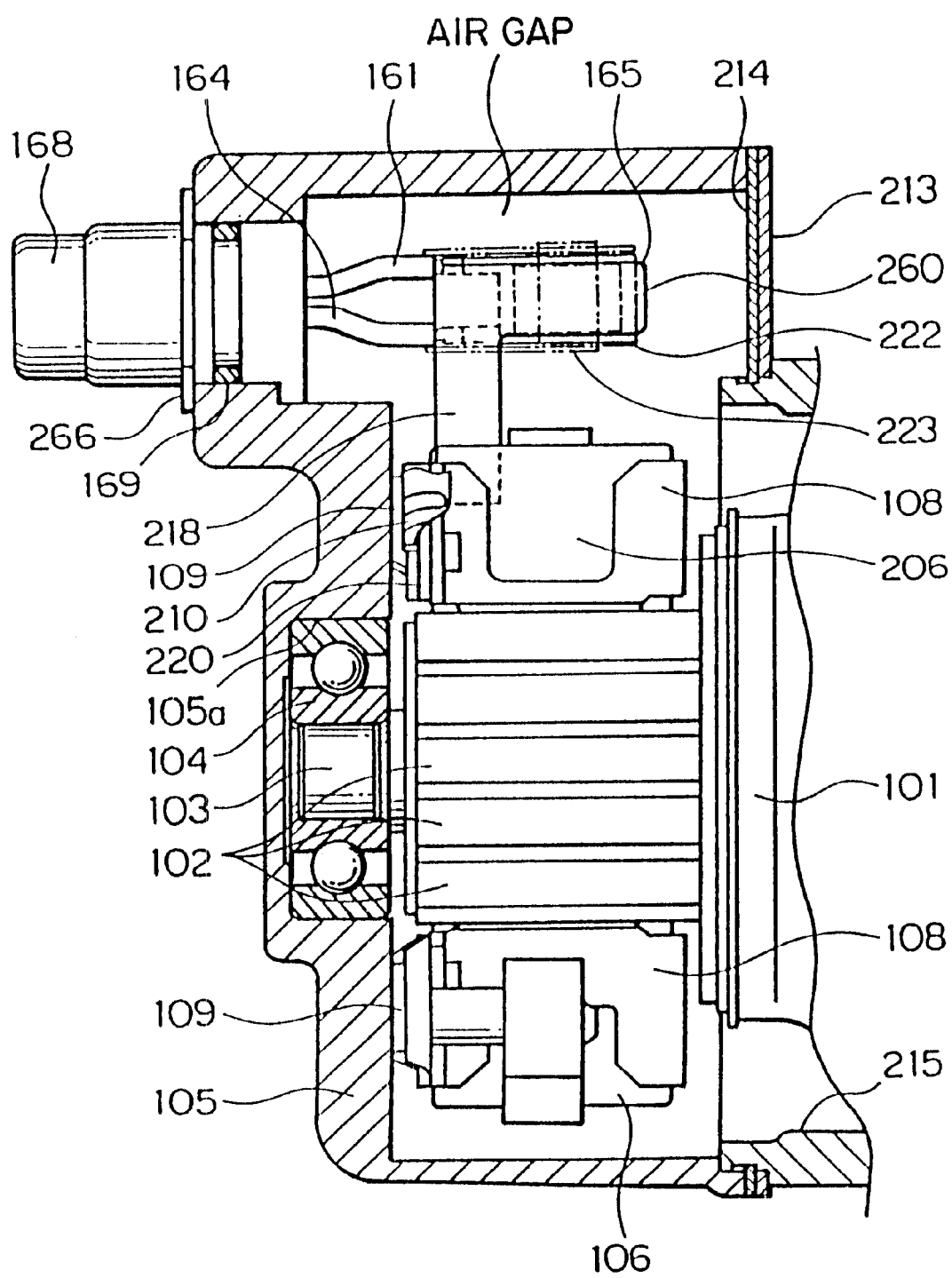
FIG. 1 is a cross-section of a mounting structure of a thermostat for a starter according to Embodiment 1 of the present invention.

FIG. 1 is a cross-section of a mounting structure of a thermostat for a starter according to an embodiment of the present invention. In FIGS. 1 to 5, parts or portions the same as or similar to those in FIGS. 6 and 7 will be given the same numbering.

In FIG. 1, the shaft 103 of an armature 101 comprising commutator segments 102 disposed plurally around the circumference thereof and constituting a motor portion is supported by a bearing 104 so as to be able to rotate freely. The bearing 104 is inserted into and supported by a recess portion 105a disposed in a thin-walled rear bracket 105 which houses the commutator segments 102.

Four generally parallelopiped brushes 106, 206 which contact the commutator segments 102 and, together with the commutator segments 102, constitute contacts for supplying electric current to the armature 101 are disposed evenly around the circumference of the armature 101 in positions facing the commutator segments 102.

A heat conducting member 218 which is an "L"-shaped brass flat plate is embedded into one of these brushes and secured by adhesive to form a heat conducting brush 206. One leg of the "L"-shaped heat conducting member 218 extends in the radial direction and has an inner end embedded into the brush 206. The other leg of the "L" of the heat conducting member 218 extends into the axial direction along a thermostat 260 which will be described later.

The brushes 106, 206 are provided with lead wires 110 (FIG. 7) and are pressed against the commutator segments 102 with a predetermined pressure by springs 107 (FIG. 7) and are each slidably supported by brush holders 108. The brush holders 108 are disposed at four positions equidistantly spaced from each other around the circumference of the armature 101 and are secured to a base 109 by rivets (not shown).

Here, an electrically insulating sheet 220 being an electrically insulating member is disposed as heat insulation between the brush holder 108 into which the heat conducting brush 206 is inserted and the base 109. Use is made of the fact that this electrically insulating sheet 220 has poor thermal conductivity, so that heat from the heat conducting brush 206 is less likely to be conducted to the rear bracket 105 through the base 109 and thus more likely to be transferred to the heat conducting member 218.

A thread hole is disposed in the base 109, and the base 109 and the rear bracket 105 are secured to each other by inserting a bolt from the outer end surface of the rear bracket 105 into a bore (not shown) disposed in the end of the rear bracket 105 so that the bolt engages the thread hole disposed in the base 109. In this way, the brush holders 108 are supported by the rear bracket 105. The rear bracket 105 is connected to a yoke 215 by means of unillustrated bolts with packing 214 and a plate 213 interposed therebetween.

A long, slender, rod-shaped thermostat 260 is disposed alongside the axial leg of the heat conducting member 218. The thermostat 260 is covered by an electrically insulating tube 222 so as not to be in direct contact with the heat conducting member 218, and is secured to the heat conducting member 218 by adhesive tape 223.

The heat conducting member 218 is a substantially only means for mechanically supporting the thermostat 260.

Consequently, the thermostat 260 is electrically insulated from the brush 206 and the rear bracket 105.

Moreover, the heat conducting member 218 supports the thermostat 260 within the starter motor 150 (FIG.6) with a thermally insulating air gap defined around the thermostat 260.

Consequently, the thermally insulating air gap makes the heat transfered to the thermostat 260 less likely to escape.

Figure 7:
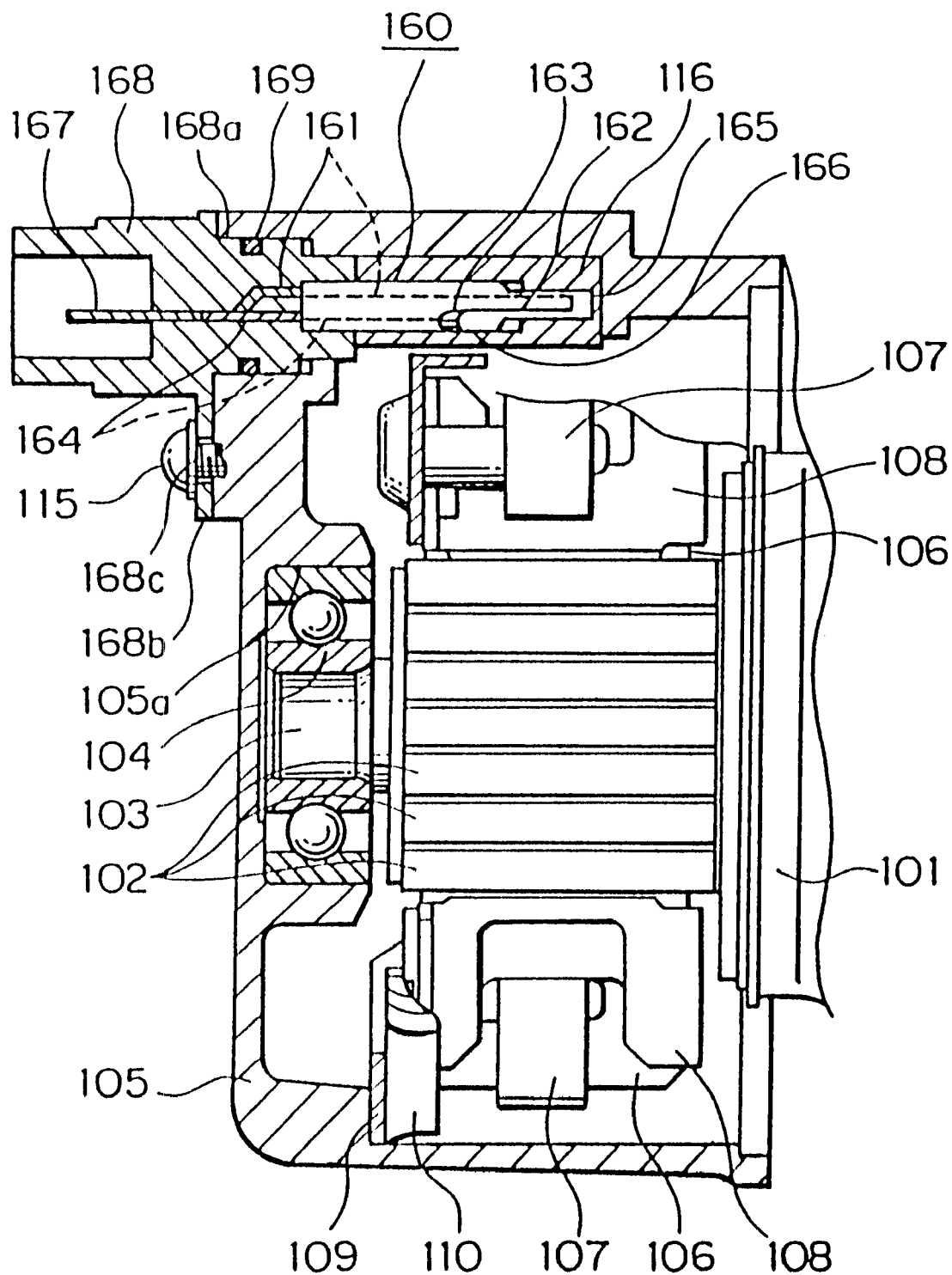
FIG. 7 is a cross-section of a mounting structure of a conventional thermostat for a starter.

Since the construction of the contacts within the thermostat 260 is the same as for those in the thermostat 160 in FIG. 7, the following explanation will be based on FIG. 7. One tip of a lead wire 161 which is one of two lead wires is connected to one end of a bimetallic element 162, and a contact 163 is disposed on the other end of the bimetallic element 162. Another contact 166 is disposed on one tip of the other lead wire 164. The bimetallic element 162 deforms such that above a predetermined temperature the contacts 163, 166 are open and on or below the predetermined temperature the contacts 163, 166 are closed.

The two lead wires 161, 164 lead from the steel terminal 165 to the outside, extending so as to be insulated from each other, and are connected to a connector 168 molded from resin so as to cover the two lead wires 161, 164.

An O-ring 169 is disposed on a cylindrical outer circumferential portion of the connector 168. A retaining ring 266 composed of a center-bored disk-shaped flat plate is secured in the vicinity of the center of the connector 168.

Figure 6:
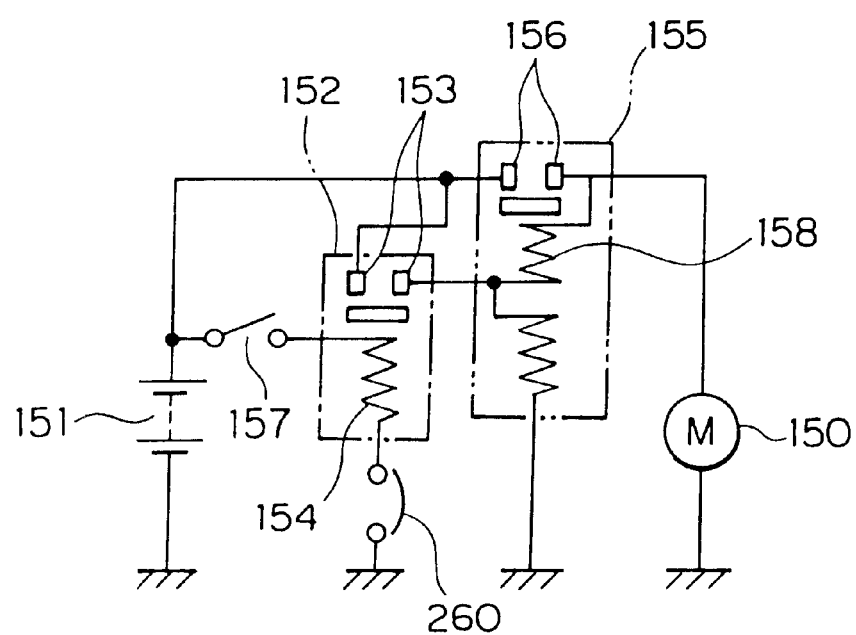
FIG. 6 is a connection diagram for a starter circuit using a starter according to Embodiment 1 of the present invention.

FIG. 6 shows an example of a connection diagram for a starter circuit using a starter with a thermostat built therein.

In the figure, 151 is a battery power source, item 157 is a start switch disposed in a key switch item 152 is an auxiliary switch provided with contacts 153 and an electromagnetic coil 154, 155 is a magnet switch, 156 are main contacts for switching on and off a main current to a starter motor 150 being a direct-current motor for starting an engine (not shown), and 158 is an attracting coil functioning dually to generate a resistance allowing a minute current to flow to the motor during engagement of a pinion gear (not shown) of the starter and to generate an attracting force to cause the pinion gear to engage with the ring gear (not shown) of the engine. The thermostat 260 secured to the heat conducting member 218 is connected in series to the electromagnetic coil 154.

Because the contacts of the thermostat 260 are closed when the starter is not generating excessive heat, the electromagnetic coil 154 is energized when the start switch 157 is switched on, closing the contacts 153 and switching on the auxiliary switch 152. At the same time, electric current flows through the attracting coil 158 of the magnet switch 155, and as the current passes to the starter motor 150, the pinion gear is shifted and brought into engagement with the ring gear. If the pinion gear properly engages the ring gear, the main contact 156 closes and the main current flows to the starter motor 150, starting the engine.

However, for reasons such as incompleteness of the return of the key switch, etc., there are cases where the start switch 157 may not be switched off and the starter motor 150 may continue to rotate even after the engine has been started. In such cases, brush heat is conducted immediately to the thermostat 260 through the heat conducting member 218 and the temperature around the thermostat 260 rises rapidly. When the thermostat 260 rises above the predetermined temperature, the contacts of the thermostat 260 open, terminating the flow of current through the electromagnetic coil 154, whereby the auxiliary switched off, terminating the supply of current to the attracting coil 158 and the starter motor 150, so that the starter does not generate excessive heat. Because the electrically insulating sheet 220 is disposed between the brush holder 108 into which the brush 206 mounted with the thermostat 260 is inserted and the base 109, heat is less likely to escape to the base 109 and thus brush heat is more likely to be conducted to the thermostat 260. Consequently, the thermostat 260 is more likely to detect increases in the temperature of the brush 206 without loss of time.

Moreover, the electrically insulating tube 222 is not required if the two lead wires 161, 164 of the thermostat 260 are electrically insulated from the steel terminal 165 of the thermostat 260, or even if one of the lead wires is electrically connected to the steel terminal 165 provided that the polarity thereof matches that of the brush 206.

Furthermore, the material of the heat conducting member 218 is not limited to brass provided that the material has a good thermal conductivity, and copper may also be used because it is similar to brass in its workability. Carbon steel, stainless steel, spring steel, etc., may also be used.

In addition, the brush holders 108 may be secured directly to the rear bracket 105 without the intermediation of the base 109.

Embodiment 2

Figure 2:
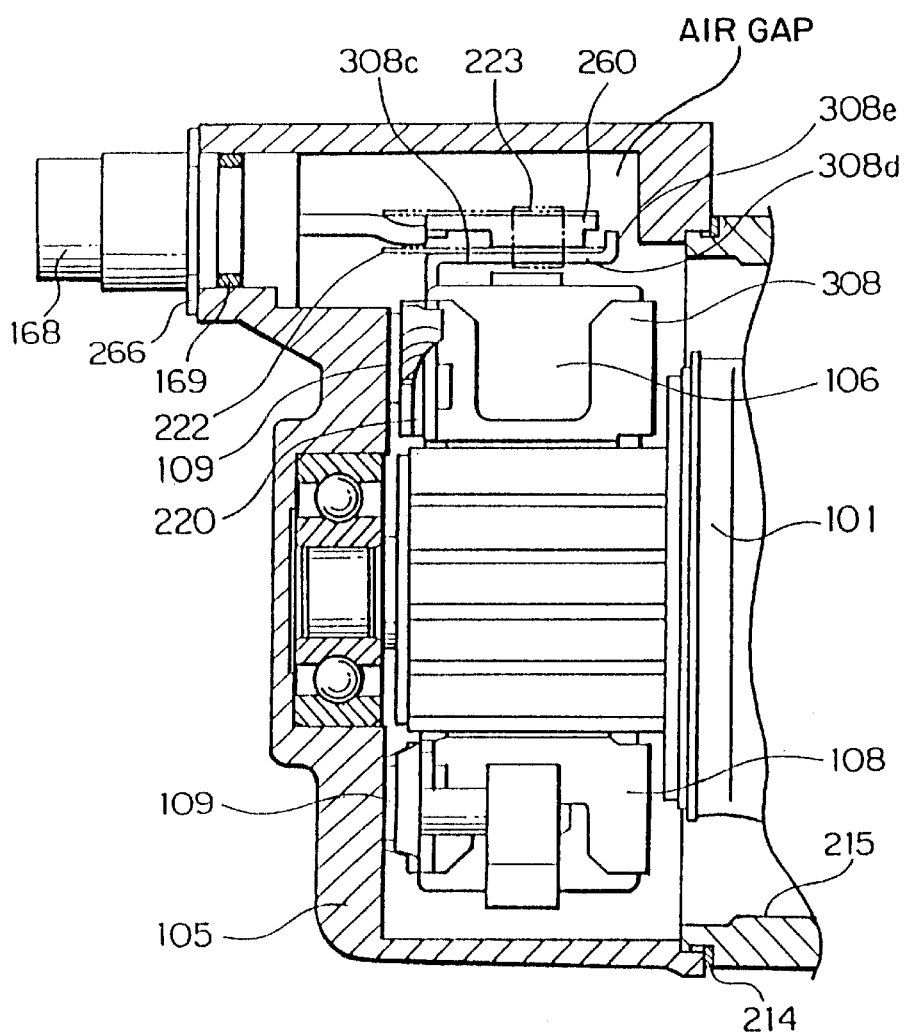
FIG. 2 is a cross-section of a mounting structure of a thermostat for a starter according to Embodiment 2 of the present invention.

FIG. 2 is a cross-section of a mounting structure of a thermostat for a starter according to another embodiment of the present invention. The portion of FIG. 2 where the thermostat is mounted is different from that of FIG. 1. That is to say, in FIG. 1, the heat conducting member 218 on which the thermostat is mounted is secured to the brush 206, but in FIG. 2, a brush holder 308 has a portion corresponding to the heat conducting member is formed integrally with the holder portion.

Figure 3:
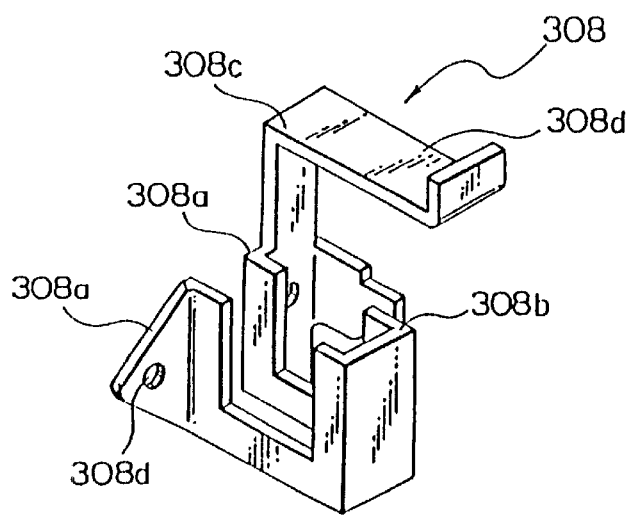
FIG. 3 is a perspective view of a brush holder for a starter according to Embodiment 2 of the present invention.

FIG. 3 is a perspective view showing the shape of the brush holder 308 in detail.

The brush holder 308 is composed of brass and comprises: flange portions 308a for securing the brush holder 308 to the base 109 by riveting; a brush receiving portion 308b covering the brush 106 on three sides; and a heat conducting portion 308c to which the thermostat 260 is secured for conducting heat from the brush 106 to the thermostat 260. In other words, the brush holder 308 has a heat conducting portion 308c added to the brush holder 108 in FIG. 1. The heat receiving portion 308c is formed by extending one of the flange portions 308a in the same plane and in the radial direction then bending it in the axial direction to form a thermostat mounting portion 308d, and in addition the end thereof is bent in the radial direction to form a bending portion 308e so as to position the thermostat 260 on the thermostat mounting portion 308d. The heat receiving portion 308c may be a separate member from the brush holder 308 and may be fastened to the flange portion 308a by welding or using bolts.

Returning to FIG. 2, the thermostat 260 covered by an electrically insulating tube 222 is secured to the thermostat mounting portion 308d of the brush holder 308, so as not to be in direct contact with the thermostat mounting portion 308d and consequently is electrically insulated from the brush 206 and the rear bracket 105.

Embodiment 3

Figure 4:
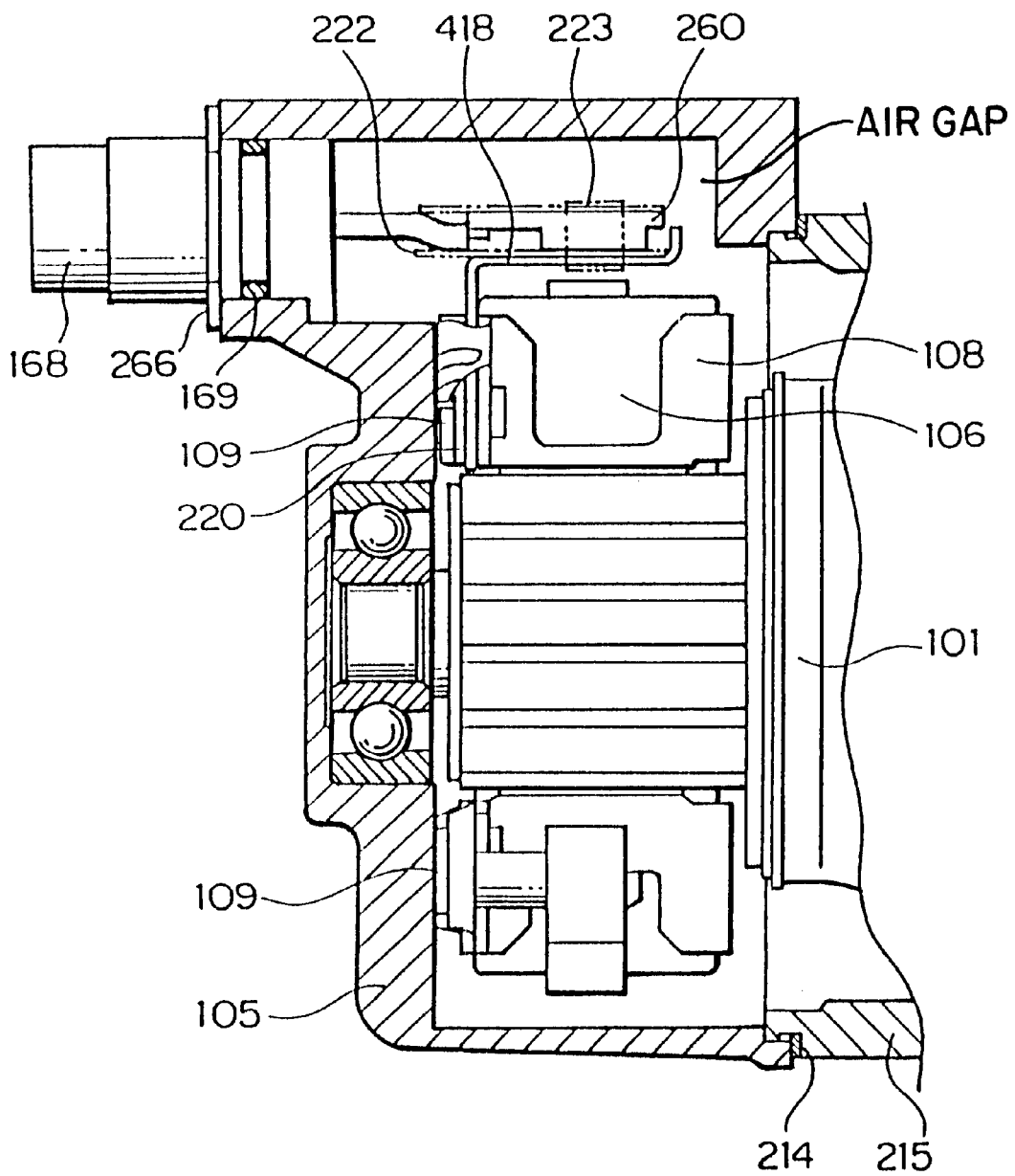
FIG. 4 is a cross-section of a mounting structure of a thermostat for a starter according to Embodiment 3 of the present invention.

FIG. 4 is a cross-section of a mounting structure of a thermostat for a starter according to yet another embodiment of the present invention. Comparing the structure of a heat conducting member 418 of this embodiment with that shown in FIGS. 2 and 3, it is understood that the heat conducting member 418 shown in FIG. 4 is separete from brush holder 108 and the heat conducting member 418 is held between the brush holder 108 and the base 109 which are secured together by rivets.

Figure 5:
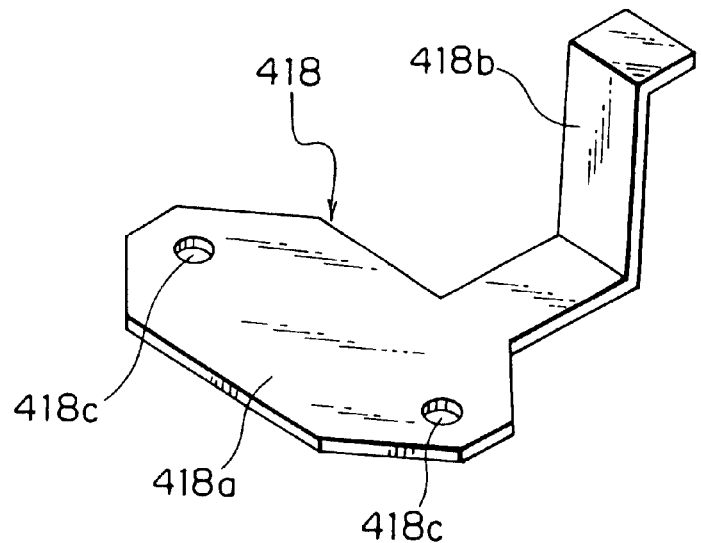
FIG. 5 is a perspective view of a heat conducting member for a starter according to Embodiment 3 of the present invention.

FIG. 5 is a perspective view showing the shape of the heat conducting member 418 in detail. The heat conducting member 418 is made of a brass flat plate, is provided with a radially extending flat surface portion 418a having bores 418c for securing by rivets designed to be held between one of the brush holders 108 and the base 109, part of which extends and then bends perpendicularly to axially extend to form a thermostat mounting portion 418b, and the end thereof bends perpendicularly to extend in the radial direction. The thermostat mounting portion 418b may be a separate member from the heat conducting member 418 and may be fastened to the flat surface portion 418a by welding or bolts.

Returning to FIG. 4, the heat conducting member 418 is held between one of the brush holders 108 and the base 109, and is firmly secured by rivets. An electrically insulating sheet 220 is held between the heat conducting member 418 and the base 109.

According to one aspect of the present invention, there is provided an engine starter comprising:

a starter motor for starting an engine, the starter motor including a brush and a brush holder; and a control circuit for controlling the starter motor, the control circuit including a thermostat for deenergizing the starter motor when the temperature of the starter motor exceeds a predetermined temperature;

the engine starter further comprising:

a heat conducting member, having a first end thermally coupled to the brush and a second end thermally coupled to the thermostat, for conducting heat from the brush to the thermostat.

According to another aspect of the present invention, the thermostat is secured to the heat conducting member and the heat conducting member is a substantially only means for mechanically supporting the thermostat.

Consequently, those can enable the brush heat to be immediately conducted to the thermostat, making the thermal conductivity to the thermostat superior. Because temperature of the thermostat is not raised by the atmosphere around the brush, it is less likely to be affected by external air temperature, providing a stable thermostat action.

According to another aspect of the present invention, the heat conducting member supports the thermostat within the starter motor with a thermally insulating air gap defined therearound, enabling to making the transfered heat to the thermostat less likely to escape.

According to another aspect of the present invention, the second leg has a bend portion for positioning the thermostat on the second leg, enabling the thermostat to be positioned on the heat conducting member facilely.

According to another aspect of the present invention, an electrically insulating material is interposed between the thermostat and the second leg of the heat conducting member, ensuring electrical insulation from the thermostat, regardless of the type of thermostat.

According to another aspect of the present invention, the first end of the heat conducting member is embedded within the brush and because the thermostat is therefore not embedded directly in the brush, the size of the brush is not increased, enabling the provision of a compact a engine starter.

According to another aspect of the present invention, the first end of the heat conducting member is an integral, continuous extension of the brush holder, enabling the heat conducting member for securing the thermostat to be provided without increasing the number of parts.

According to another aspect of the present invention, the first end of the heat conducting member extends from a mounting flange of the brush holder, enabling existing brush holders and brushes to be used without modification.

According to another aspect of the present invention, a thermally insulating material is interposed between the rear bracket and the first end of the heat conducting member, making brush heat less likely to escape to the base, further improving thermal conductivity to the thermostat.

What is claimed is:

1. An engine starter comprising:

a starter motor for starting an engine, said starter motor including a brush and a brush holder; and a control circuit for controlling said starter motor, said control circuit including a thermostat for deenergizing said starter motor when the temperature of said starter motor exceeds a predetermined temperature;

said engine starter further comprising:

a heat conducting member, having a first end thermally coupled to said brush and a second end thermally coupled to said thermostat, for conducting heat from said brush to said thermostat, wherein said thermostat detects said heat conducted from said heat conducting member for deenergizing said starter motor.

2. The engine starter as claimed in claim 1, wherein said thermostat is secured to said heat conducting member and wherein said thermostat is mechanically supported primarily by said heat conducting member.

3. The engine starter as claimed in claim 2, wherein said heat conducting member supports said thermostat within said starter motor, and said starter motor has a thermally insulating air gap defined around said thermostat.

4. The engine starter as claimed in claim 1, wherein said heat conducting member is a substantially y-shaped metal member having first and second legs of "L", said first leg being thermally coupled to and extending from said brush in a substantially radial direction of the starter motor, and said second leg extending in a substantially axial direction of the starter motor and substantially along said thermostat.

5. The engine starter as claimed in claim 4, wherein said second leg has a bend portion for positioning said thermostat on said second leg.

6. The engine starter as claimed in claim 4, wherein said thermostat and said second leg of said heat conducting member are wrapped together by an adhesive tape.

7. The engine starter as claimed in claim 4, wherein an electrically insulating material is interposed between said thermostat and said second leg of said heat conducting member.

8. The engine starter as claimed in claim 1, wherein said first end of said heat conducting member is embedded within said brush.

9. The engine starter as claimed in claim 1, wherein said first end of said heat conducting member is an integral, continuous extension of said brush holder.

10. The engine starter as claimed in claim 9, wherein said first end of said heat conducting member extends from a mounting flange of said brush holder.

11. The engine starter as claimed in claim 9, wherein said first end of said heat conducting member is mechanically fastened to said brush holder, and is held between a rear bracket of the starter motor and said brush holder secured to each other, wherein a thermally insulating material is interposed between said rear bracket and said first end of said heat conducting member.

12. The engine starter as claimed in claim 1, wherein said first end of said heat conducting member is mechanically fastened to said brush holder.

13. The engine starter as claimed in claim 12, wherein said first end of said heat conducting member is held between a rear bracket of the starter motor and said brush holder secured to each other.

14. The engine starter as claimed in claim 13, wherein a thermally insulating material is interposed between said rear bracket and said first end of said heat conducting member.

* * * * *